July 15, 1958    J. VILLARS    2,843,223
LIFTING APPLIANCE
Filed Oct. 24, 1955    5 Sheets-Sheet 1

INVENTOR
JULIO VILLARS
BY Young, Emery & Thompson
ATTYS.

July 15, 1958
J. VILLARS
2,843,223
LIFTING APPLIANCE
Filed Oct. 24, 1955
5 Sheets-Sheet 2
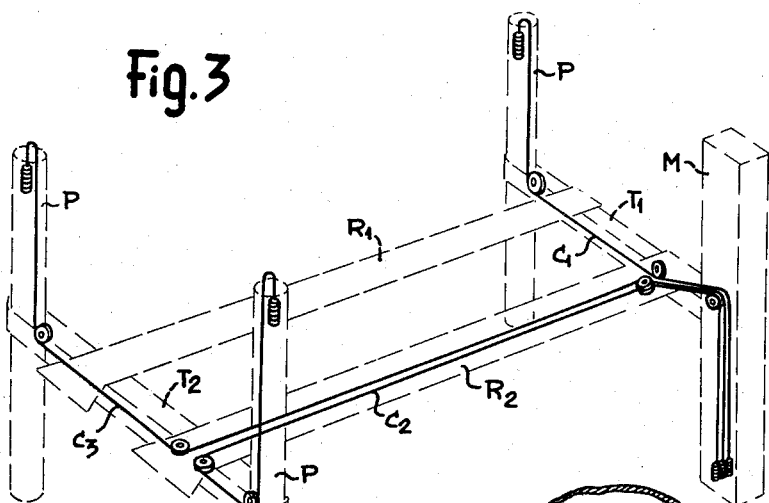
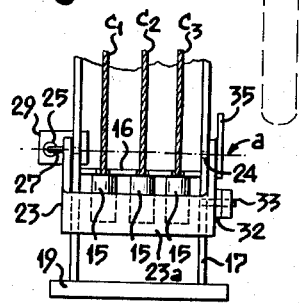
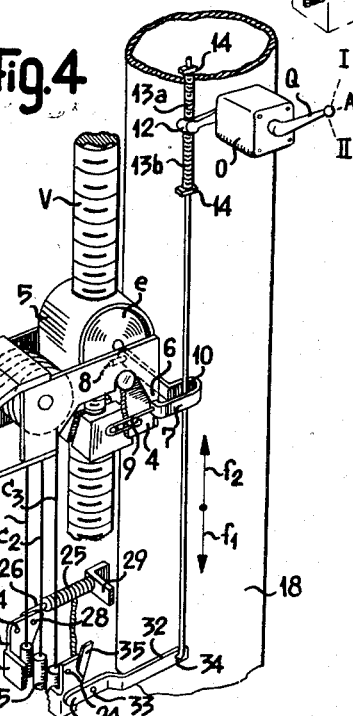
INVENTOR
JULIO VILLARS
By Young, Emery & Thompson
ATTYS.

July 15, 1958 J. VILLARS 2,843,223
LIFTING APPLIANCE
Filed Oct. 24, 1955 5 Sheets-Sheet 3
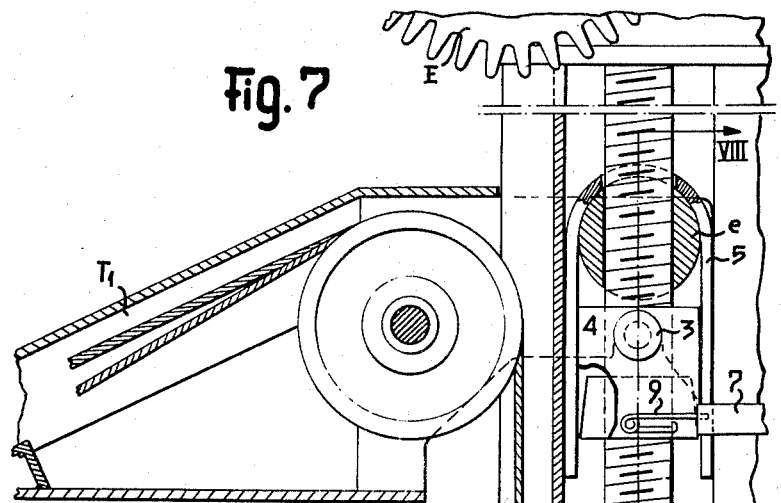
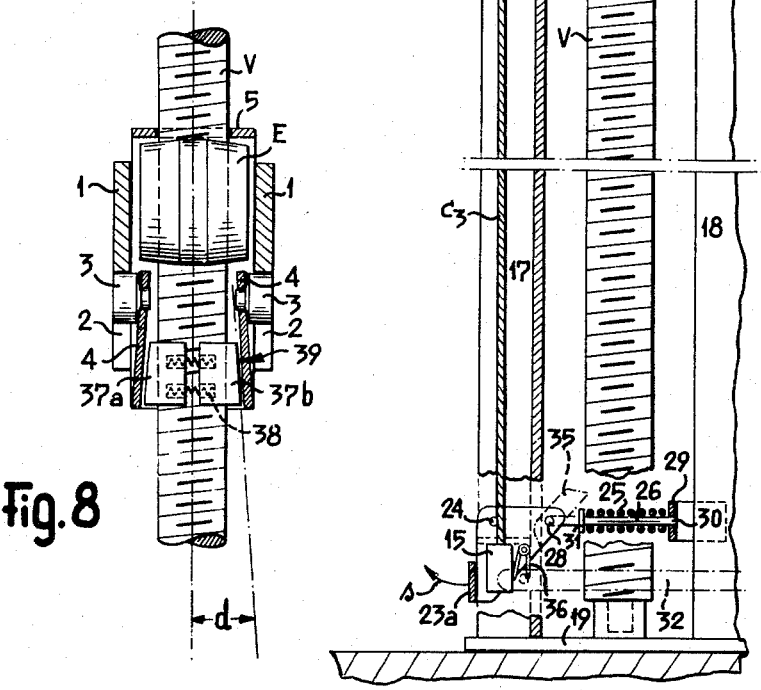
INVENTOR
JULIO VILLARS
ATTYS.

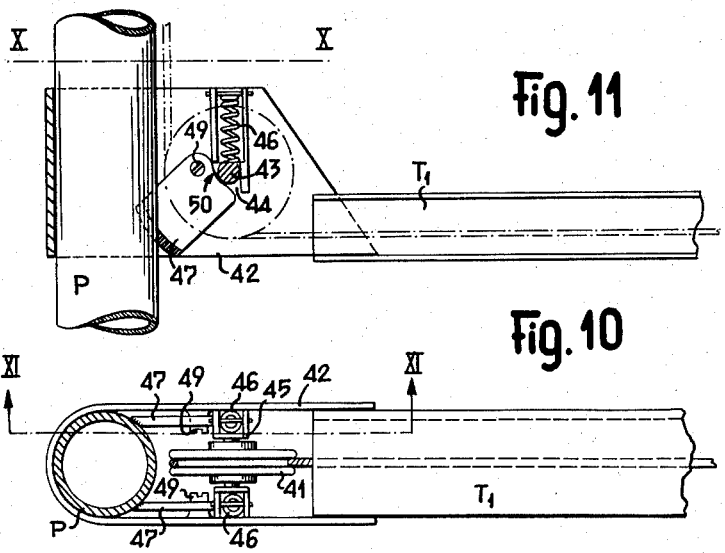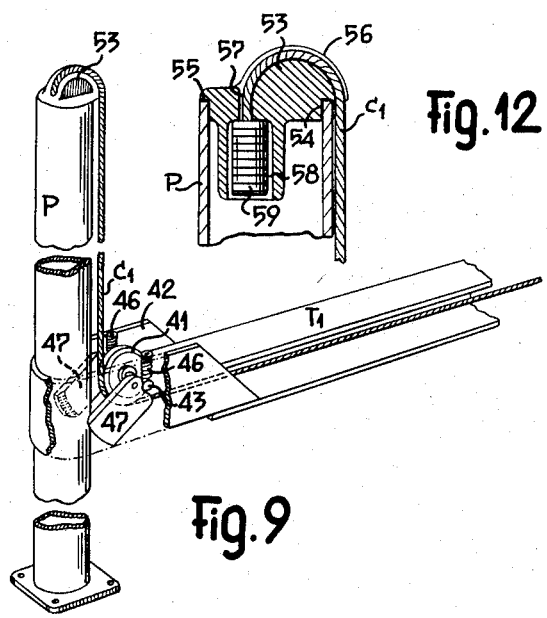

July 15, 1958
J. VILLARS
2,843,223
LIFTING APPLIANCE
Filed Oct. 24, 1955
5 Sheets-Sheet 5
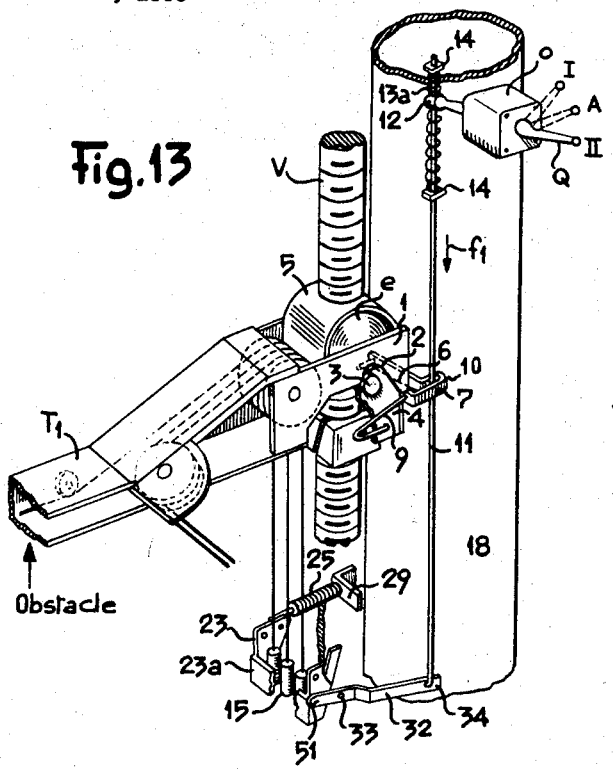
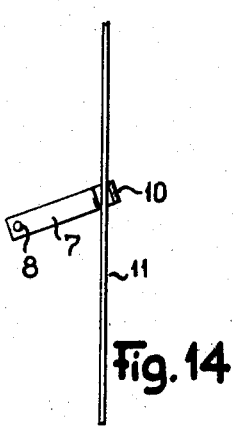
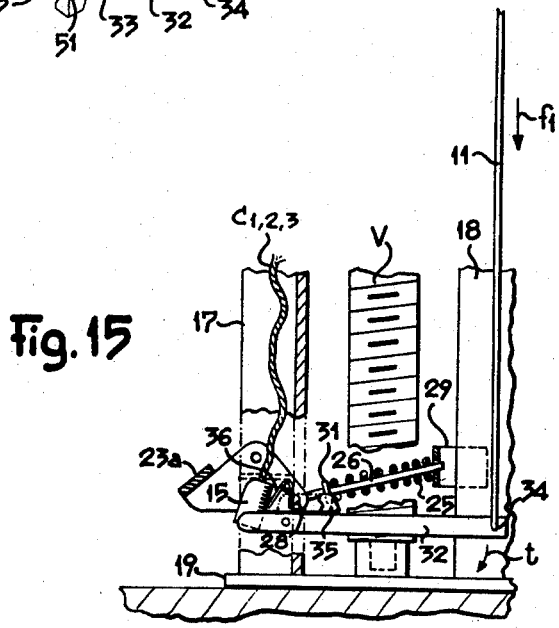
INVENTOR
JULIO VILLARS
BY Irwin S. Thompson
ATTY.

United States Patent Office 2,843,223
Patented July 15, 1958

2,843,223

LIFTING APPLIANCE

Julio Villars, Versoix-Geneva, Switzerland

Application October 24, 1955, Serial No. 542,405

Claims priority, application Switzerland October 30, 1954

16 Claims. (Cl. 187—8.47)

The present invention has for its object a lifting appliance including a platform mechanically connected with a nut fitted over a screw suspended from the upper end of a protecting column. Such appliances are well-known and are in common use in garages, for instance for lifting touring cars. Although these appliances are widely used, they do not always provide the desired reliability, in particular with a view to avoiding accidents due to the breaking off of one of the suspension members of the platform and also the damages to which the appliance itself is subjected when meeting an obstacle lying on the path of the platform during its downward stroke.

The present invention tends at removing the drawbacks of prior known appliances by the fact that it includes at least one safety device the working of which, caused by the removal of at least a part of the action exerted on a sustentation member of the platform, provokes the stopping of the appliance.

The accompanying drawing illustrates schematically and by way of example an embodiment of the appliance object of the invention.

Fig. 3 is a diagrammatic showing of the cables carrying the platform.

Fig. 4 is a perspective view of the upright enclosing the actuating screw and safety means for a resting position of the platform.

Figs. 5 and 6 are detail views.

Fig. 7 is an axial sectional view of said upright enclosing the actuating screw.

Fig. 8 is a partial sectional view along line VIII—VIII of Fig. 7.

Fig. 9 is a partial perspective view of a carrying upright, parts of which are torn away.

Fig. 10 is a partial sectional view along line X—X of Fig. 11.

Fig. 11 is a sectional view along line XI—XI of Fig. 10.

Fig. 12 is a sectional view of a detail.

Fig. 13 is a perspective view of the upright according to Fig. 4, but showing the relative positions of the safety means when the downward moving platform is just encountering an obstacle located near the said upright.

Fig. 14 is a sectional view of a detail of Fig. 13.

Fig. 15 is a fragmentary view of the upright according to Fig. 7, but showing the relative positions of the safety means when the downward moving platform is encountering an obstacle located near one of said carrying uprights.

Figure 1:
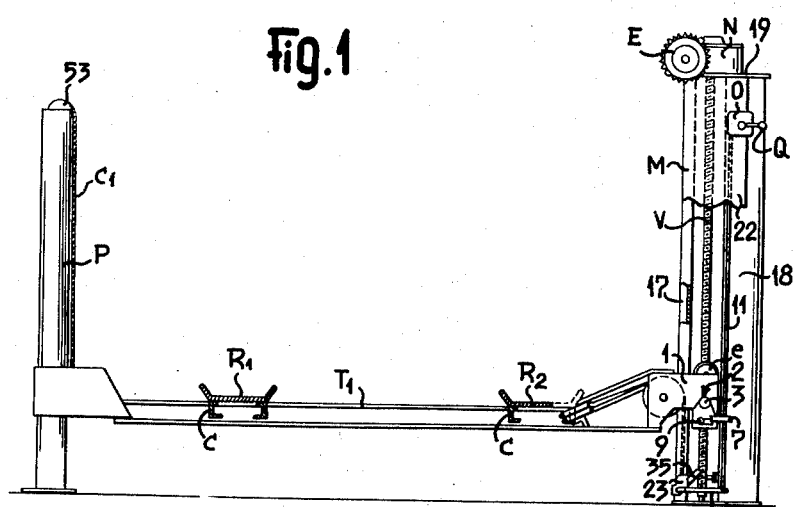
Fig. 1 is a sectional view along line I—I of Fig. 2 of a lifting appliance.
Figure 2:
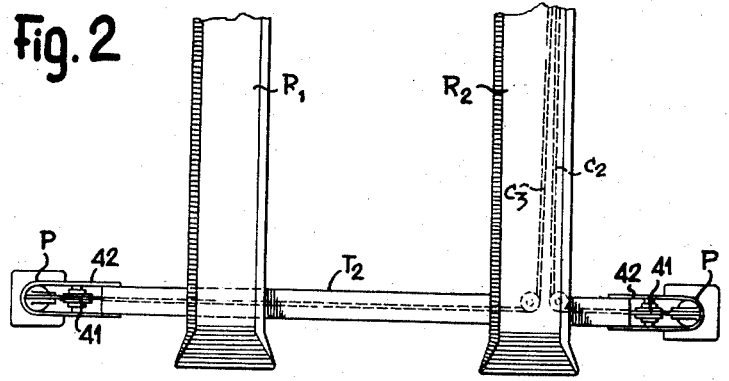
Fig. 2 is a plan view thereof.

According to the accompanying drawing, the appliance illustrated includes as in the case of other known appliances a platform constituted by two cross-members $T_1$, $T_2$, on which rests two runways $R_1$, $R_2$, provided with box-shaped reinforcements C.

Said platform is located between four uprights which form three so-called carrying uprights P and one so-called driving upright M enclosing and protecting a vertical screw V suspended at its upper end and driven by an electric motor E by the intermediary of a speed reducer N. Three of the corners of said platform are suspended by means of three cables $c_1$, $c_2$, $c_3$ of a constant length and one of the ends of each of which is secured to the upper end of a carrying upright, while their other end is secured to the lower end of the driving upright. The fourth corner of said platform is carried by a nut $e$ (Fig. 4) fitted over the screw V.

The driving upright M is further provided with a control box O comprising a handle Q and allowing to control the starting in one and in the other direction of the electric motor in order to cause the raising or the lowering of the platform.

In the lifting appliance, illustrated in the drawing, the cross-member $T_1$ is connected with the nut $e$ by means of a one way coupling device. Said device is constituted on the one hand by two lateral plates 1, forming extensions of the cross-member $T_1$ and provided each with a V-shaped notch 2, the bottom of which is rounded and on the other hand by two trunnions 3 on which bear the plates 1. These trunnions are rigidly fastened to two sidewalls 4 (Fig. 4) closing the lateral sides of a strap 5 in the shape of an inverted U and resting on the nut $e$ of a generally cylindrical shape. One of the lateral plates 1 is provided with a nose 6 acting on the lever 7 pivoted at 8 on the flange 5 and submitted to the action of a spring 9 tending to keep said lever into contact with the nose 6. Said lever 7 presents a loop-shaped part 10 crossed by a rod 11 engaged in a hole of a lever 12 connected rigidly with the control handle Q. Said rod 11 is mechanically connected with said lever 12 by means of two coil springs $13_a$ and $13_b$ staying on one and the other side of said lever and on two stops 14 rigidly fastened to the rod 11.

One of the ends of each of the cables $c_1$, $c_2$, $c_3$ stays on the upper end of the corresponding carrying upright by the intermediary of a removable cable-fastening member 53 (Fig. 12). Said member includes a cylindrical section 54 the diameter of which corresponds to the inner diameter of the tube forming the carrying upright, a shoulder 55 bearing against the upper end of the upright and a groove 56 in the shape of a half-circle prolongated by a bore 57 which opens into an inner recess 58. The cable provided with an end piece 59 is fitted in said member as illustrated in Fig. 12 and said member 53 may be readily fitted inside the upper end of the carrying upright and be removed therefrom.

The other ends of these three cables $c_1$, $c_2$, $c_3$ stay by means of end-pieces 15 on a member 16 having the shape of a comb, which is rigidly secured between the wings of a U-shaped profiled iron member 17 and forming one of the vertical members of the driving upright, the second vertical member of which is constituted by a tube 18. These two members 17 and 18 are interconnected at each of their ends by means of a connecting member 19. The lower connecting member carries a centering bearing 20 (Fig. 6) in which is fitted a cylindrical extension 21 of the lower end of the driving screw V. The upper connecting member which is crossed by the screw V carries the motor E and the speed reducer N. As illustrated on the drawing, said screw is housed between the two vertical members of the driving upright, which is closed by two lateral protecting metal sheets 22.

A stirrup-shaped member 23 provided with two trunnions 24 fitted in corresponding perforations made in the wings of the vertical member 17 may rock round the axis $a$. The middle part $23_a$ of said stirrup is held in contacting relationship with the edges of the wings of said vertical member 17 by a spring 25. Said latter is fitted over a rod 26 provided with a nose 27 engaging an opening 28 in the stirrup 23. Said rod may slide inside a bore 30 made in a member 29 rigidly fastened to the vertical member 18. The spring 25 bears against said member 29 and exerts a thrust on a stop 31 rigidly fastened to the rod 26.

For the "cocked" position of the stirrup (position illustrated on Fig. 6) the opening 28 is located at a short distance (1 to 4 mm.) above the straight line $g$ connecting the axis of rotation $a$ with the axis of the guide 30. Thus, the spring 25 has a tendency to hold the stirrup in its "cocked" position.

A lever 32, hinged at 33 on the wing of the vertical member 17 and at 34 on the lower end of the rod 11, is actuated, whenever the stirrup 23 rocks, by a hammer 35 rigidly fastened to said stirrup. Each cable endpiece 15 is submitted to the action of a spring 36 tending to rock it outwardly in the direction of the middle part $23_a$ of the stirrup.

The working of the described appliance is as follows:

By actuating of the handle Q, the user may as desired cause the upward or downward movement of the platform. For the position A of the handle Q, the feeding circuit of the electric motor is switched off and the platform remains stationary. When this handle is shifted upwardly into the position I, the motor is energised and causes the rising of the platform. On the contrary, when the handle Q is in the position II, the motor E causes the lowering of the platform. When during the downward movement of the platform an obstacle (a stand, a box etc.) is located on its path, one of the cross-members $T_1$, $T_2$ comes to lie on said obstacle. According to the location of said obstacle, the action exerted by the weight of the platform on one or the other of the cables $c_1$, $c_2$, $c_3$ or on the nut $e$ is removed. Now, by examination of the drawing, one sees that, as soon as one of said members is no longer submitted to the action of the weight of the platform, the rod 11 is shifted in the direction of the arrow $f_1$ or $f_2$ and produces the stopping of the appliance.

Indeed, if the obstacle is located near the driving upright M, the cross-member $T_1$ or the rolling-way $R_2$, when coming to lie on said obstacle, stops the downward movement of the lateral plates 1 (Fig. 13). The nut $e$ continuing its downward stroke carries along with it the casing 4, 5 in its downward movement, and the trunnions 3 move out of their recesses 2. This leads them to a relative shifting between the plates 1 and the casing 4, 5. However, the spring 9 urging the lever 7 into contacting relationship with the nose 6 causes a rocking of said lever on its pivot 8.

Now said rocking of the lever 7 causes a wedging of the rod 11 between the walls of the loop-shaped section 10 (Fig. 14). From this moment onwards, said rod 11, mechanically connected with the casing 4, 5 is carried along in the direction of the arrow $f_1$ in the displacement of the nut $e$ and compresses the spring $13_a$. As soon as the displacement of the rod 11 reaches a predetermined value, the spring $13_a$ is sufficiently stressed to actuate downwardly the lever 12 as far as its "stop" position illustrated in the drawing (Fig. 4). The motor M which is no longer fed with electric energy stops and also the whole lifting appliance.

On the contrary, if the obstacle is located near one of the carrying uprights P, it suppresses, when the platform rests on it, the action of the weight of said platform on one of the cables $c_1$, $c_2$, $c_3$. From this moment onwards, the cable is no longer stretched by the weight of the platform and its end-piece 15, submitted to the action of the corresponding spring 36, rocks and actuates the stirrup 23 in the direction of the arrow $s$ (Figs. 7 and 15). As soon as the hinge 28 of the rod 26 on the stirrup 23 has gone over the opposite side of the straight line $g$ connecting the axis $a$ of the stirrup with the guide 30 for the rod 26, the spring 25 causes a quick rocking of said stirrup and the hammer 35 hits the lever 32, causing said lever to rock in the direction of the arrow $t$, and to displace then the rod 11 in the direction of the arrow $f_1$. The displacement of said rod 11 assumes a sufficient value to cause the actuating of the lever 12 downwardly until its "stop" position illustrated on the drawing (Fig. 4).

Thus, whatever may be the part of the platform which stays on the obstacle, one or the other of the devices responsive to the suppression of the action, exerted by the weight of the platform on a member, is set in function and causes the stopping of the appliance. In this way, in any case the platform may not assume a dangerous inclination and no member of said appliance risks being damaged as is the case in known lifting appliance, when the obstacle cannot be broken by the weight of the platform.

The described lifting appliance comprises further a safety device which prevents the dropping down or the rocking of the platform when the threads of the nut $e$ are broken off as a consequence of their wear. Said device includes a safety nut constituted by two segments $37_a$, $37_b$ fitted over the screw V and submitted to the action of springs 38 urging them away from each other. The side walls 39 of said segments are inclined and form an angle $d$ with the axis of the screw V. Under the action of the springs 38, said walls 39 engage the side walls 4 which are also inclined by the same angle $d$ with reference to the axis of the screw V. By examining more particularly Fig. 8, one sees that when the threads of the nut $e$ are broken off and that the action exerted by the weight of the platform on said nut is suppressed, the strap 5 is carried along downwardly by the lateral plates 1 resting on the trunnions 3 and the inclined side walls 4 act on the inclined walls 39 of the segments against the action of the springs 38, whereby said segments are caused to clamp the screw V and to lock said screw. The electric motor, which can now no longer drive the screw, becomes hot and its safety means, such as relays or fuses, operate and prevent any damage of the appliance. It should be remarked that these safety devices operate in all cases, whether the breaking off of the nut $e$ occurs during the rising movement or during the lowering movement of the platform.

The lifting appliance is further provided with safety devices which prevent any rocking of the platform at the moment of the breaking off of a cable $c_1$, $c_2$, $c_3$. These safety devices include reversing sheaves 41 (Figs. 9 to 11) arranged at the three ends of the cross-members $T_1$ and $T_2$ which are facing the carrying uprights P. These three ends of the cross-members $T_1$ and $T_2$ carry each a collar 42 embracing a carrying upright and sliding along said upright.

Each sheave 41 revolves freely round a spindle 43, the two ends of which slide inside guides 44 rigidly fastened to the collar 42. Under the action of the weight of the platform, the ends of said spindle stay, against the action of the springs 46, on the lower ends of walls 45 of said guides 44. Jaws 47 hinged on shouldered screw 49 rigidly fastened to the collar 42 include rear cam-shaped ends 50 adapted to cooperate with the spindle 43.

When a cable $c_1$, $c_2$, $c_3$ breaks, the action of the weight of the platform on the spindle 43 is suppressed and consequently, under the action of the springs 46, said spindle is displaced downward and acts on the cams 50 of the two corresponding jaws 47, located to either sides of the carrying upright P. These jaws are then wedged between the collar 42 and the carrying upright and they lock instantaneously said corner of the platform in its position.

Simultaneously, the end-piece 15 of the broken cable rocks under the action of its spring 36 and causes a rocking of the stirrup 23, the hammer 35 of which acts on the lever 32 in order to cause the return of the handle Q into the "stop" position. As illustrated on the drawing, for the "stop" position of the control box O, the lever 32 lies in a horizontal plane. Thus, when the handle Q is in the position II, the pivotal connection 34 is located above the pivotal axis 33. Consequently, when the stirrup 23 rocks, the hammer 35 returns said lever into its horizontal position and causes a stopping of the appliance.

On the contrary, when the handle Q is in the position I, the pivotal connection 34 is lower than the pivotal axis 33. Consequently, when the stirrup 23 rocks, the hammer 35 acts on an extension 51 of the lever 32 and returns said lever into its horizontal position and causes a shifting of the rod 11 in the direction of the arrow $f_2$, in order to return the handle Q into the "stop" position.

Thus, the rocking of the stirrup 23 out of its "cocked" position, always produces the stopping of the motor E, whether the platform is urged upwardly or downwardly at the moment of the breaking of a carrying cable.

The preceding disclosure shows that the safety device with which the lifting appliance, according to the invention, is provided allows to prevent completely all accidents due to the cutting out of the action of the weight of the platform on a member necessary for the keeping of said platform in its horizontal position and which may be termed a "sustaining member." Practical experimentation executed with lifting appliance for motor cars equipped with the safety device according to the invention have shown that it is possible to make this device highly responsive, so that the stopping of the lifting appliance is obtained as soon as only a fraction of the weight of the platform ceases acting on a sustaining member. This safety device forms thus a considerable technical improvement which is capable of ensuring efficiently the safety of the attendants.

An embodiment of the safety device forming the object of the invention has been described herein-above by way of exemplification and with reference to the accompanying drawings, but obviously all the members and parts of said safety device may be replaced by their equivalent members.

However, the device described shows the advantage of being a very simple design and adapted to be executed with very strong parts. Furthermore, a single common actuating member constituted by the rod 11 connects the control box O with the safety devices, which allows a considerable simplification in the execution while leading to a very low cost price.

I claim:

1. A lifting appliance comprising a platform, an actuating screw, a nut mechanically connected to said platform and engaged by said screw, a protecting upright, said screw being suspended from the upper end of said upright, an electric motor driving said screw, a control box in the fitting circuit of said motor, three cables of an unvarying length carrying three corners of said platform, while the fourth corner is carried by the nut, three tubular carrying uprights, grooved pulleys located opposite said three uprights and a removable member engaged in the upper end of each of said three uprights, one end of each of said three cables being secured to the upper end of an upright by means of one of said removable members, and safety means for stopping the operation of the lifting appliance caused when at least a part of the action exerted by the weight of the platform on any one of the uprights is cut out; said safety means including a single actuating member connected to the control box for breaking off the feeding circuit to the motor.

2. A lifting appliance according to claim 1 and comprising rolling-ways, two cross-members carrying said rolling-ways and guiding collars rigidly fastened to the ends of said two cross-members and embracing each one of said three carrying uprights.

3. A lifting appliance according to claim 2 and comprising a spindle carrying each of said grooved pulleys located opposite the three carrying uprights and bearing surfaces rigidly fastened to the cross-members, springs pressing against the end of the spindle, the ends of each of said spindle resting under the action of the weight of the platform and against the action of springs, on said bearing surfaces.

4. A lifting appliance according to claim 3 and wherein the spindle of each grooved pulley is shiftable parallelly to itself under the action of said springs, when the cable breaks.

5. A lifting appliance according to claim 4 and comprising two brake jaws carried by each collar embracing a carrying upright, means to control, when a cable breaks, the setting in operative position of said brake jaws by the shifting of the spindle of the grooved pulley under the action of said springs, in order to lock the platform in its position.

6. A lifting appliance according to claim 5 and comprising a spring acting laterally on each cable, in order to shift laterally a part of said cable when said cable breaks.

7. A lifting appliance according to claim 6 including a stirrup rockably mounted on the protecting upright, a spring acting on said stirrup to maintain it in a cocked position, one part of said stirrup being located opposite the cable, a mechanical connection between the stirrup and the actuating member of the control box, whereby a lateral shifting of a part of a cable when said cable breaks, controls the release of said stirrup to cause the breaking off of the feeding circuit of the motor.

8. In a lifting appliance of the kind including four posts, a platform movable vertically between said four posts, four suspension members each carrying one corner of said platform and each suspended from the upper end of one of said four posts, a driving motor, a control box for said motor fastened to one of said posts, the combination of four safety devices one for each corner of said platform, the working of each safety device being caused by the stopping of the downward movement of said platform while the motor continues to operate, a common actuating member actuated by any one of said four safety devices and operating said control box in order to cause automatically the stopping of said motor.

9. In a lifting appliance according to claim 8 wherein one of said suspension members is constituted by a screw driven by said motor, and comprising a nut engaged on said screw, a housing resting on said nut, supports carried by said housing, carrying members fastened to one corner of said platform and resting on said supports, a spring loaded driving member hinged to said housing and embracing said actuating member, said driving member being prevented from coming in engagement with said actuating member by said carrying members acting on said driving member against the action of its spring, said driving member coming into engagement with said actuating member as soon as a relative displacement occurs between said carrying members and said supports, whereby said driving member drives said actuating member in the downward displacement of said housing and causes the actuating of said control box to stop said motor.

10. In a lifting appliance according to claim 9 and wherein the three other suspension members are constituted by three cables of constant length, means for fastening one end of each cable to the upper end of the three posts respectively and the second end of each of said three cables to the foot of said post housing said driving screw, three spring loaded oscillating members each cooperating with the lower part of one of said three cables, a driving member actuated by any one of said spring loaded oscillating members when said member oscillates under the action of its spring but against the strengthening action of the weight of the platform acting on said cable, a pivotally mounted stirrup maintaining said driving member in a "cocked" position, a connecting member connected to said actuating member and driven by said driving member driven out of its "cocked" position by one oscillating member, to actuate said control box and cause the stopping of said motor when said platform is stopped in its downward movement while said motor continues to operate.

11. In a lifting appliance according to claim 10 wherein each corner of said platform is prevented from falling down by a blocking device, one of said blocking devices comprising a security nut formed of at least two segments, springs acting on said segments to spread said segments away from said screw and to apply said segments against parts of the walls of said housing, cam means on said housing and on said segments causing, when the said housing displaces downward with respect to said segments, the jamming of said segments onto said driving screw and the stopping of said screw; the other three blocking devices each comprising a collar fastened to the corresponding corner of said platform and embracing its corresponding post, two brake shoes hinged on said collar on opposite sides of said post, a spring loaded spindle movable vertically, guides rigidly fastened to said collar, the ends of said spindle sliding along said guides, a sheave revolving freely around said spindle and rolling along one of said three cables, bearing faces on said guides on which said spindle rests under the action of the weight of the platform and against the action of said springs, cam means on said brake shoes in engagement with said spindle, whereby in the event of a cable failure, the corresponding spindle is driven downwards under the action of its springs and by the intermediary of said cam means forces said two brake shoes in a jamming position between said post and said collar in order to block said corner of the platform in its position, and whereby simultaneously said cable failure causes, by the intermediary of the corresponding security device, the stopping of said motor so that said platform remains in a horizontal plane.

12. In a lifting appliance according to claim 8 comprising a lift mechanism housed in one of said four posts and mechanically connected to one of the corners of said platform, three of the suspension members comprising cables of constant length carrying the three other corners of said platform, one end of each of said cables being fastened to the lower part of the post housing said lifting mechanism, a removable member engaged in the upper end of each of the three other posts and resting on the front face of said post, and means for fastening the second end of each of said three cables to its corresponding removable member.

13. A lifting appliance comprising a platform, four uprights, three cables of an unvarying length carrying three corners of the platform, each cable having one end thereof engaged in the upper end of an upright, an actuating screw suspended from the upper end of the fourth upright, a nut mechanically connected to said platform and engaged by said screw, an electric motor for driving said screw, a circuit maker and breaker in the supply circuit of the motor, and a plurality of safety devices, one for each corner of the platform for stopping the operation of the lifting appliance when said platform encounters an obstacle in either its upward or downward movement, and a single actuating member operated by any one of said safety devices and connected to the circuit maker and breaker of the motor for breaking off the supply circuit of the motor to automatically stop the operation of the lifting appliance.

14. A lifting appliance as set forth in claim 13 including a stirrup rockably mounted on the fourth upright, a spring acting on said stirrup to maintain it in a cocked position, one part of said stirrup being located opposite the cable, a mechanical connection between the stirrup and the actuating member, whereby a lateral shifting of a part of a cable, when said cable breaks, controls the release of said stirrup to operate the actuating member to cause the breaking off of the supply circuit of the motor.

15. A lifting appliance as set forth in claim 13, wherein three of said four uprights each has a removable member mounted in the upper end thereof, and means for fastening the one end of each cable to said member; said means comprising a bore in said member, a semicircular groove in the upper portion of the member forming a prolongation of said bore, and an end piece on said cable fitting in said bore with part of said cable resting in said groove.

16. A lifting appliance comprising a platform, four uprights, three cables of an unvarying length carrying three corners of the platform, each cable having one end thereof engaged in the upper end of an upright, an actuating screw suspended from the upper end of the fourth upright, a nut mechanically connected to said platform and engaged by said screw, an electric motor for driving said screw, a circuit maker and breaker in the supply circuit of the motor, means for fastening the other ends of said three cables to the foot of the upright housing the actuating screw, a spring loaded oscillating member cooperating with the lower part of each of said cables, a driving member actuated by any one of said oscillating members when said member oscillates under the action of its spring but against the strengthening action of the weight of the platform acting on said cable, a pivotally mounted stirrup maintaining said driving member in a cocked position, a single actuating member connected to the circuit maker and breaker of the motor, and a connecting member connected to said actuating member and driven by said driving member when said driving member is driven out of its cocked position by any one of said oscillating members due to a break in any one of the cables.

References Cited in the file of this patent

UNITED STATES PATENTS

| 2,150,628 | Mizer | Mar. 14, 1939 |
| 2,216,058 | Thompson | Sept. 24, 1940 |
| 2,624,546 | Haumerson | Jan. 6, 1953 |

FOREIGN PATENTS

| 833,872 | France | Aug. 1, 1938 |
| 1,096,272 | France | Jan. 26, 1955 |